(12) United States Patent
Waggoner

(10) Patent No.: US 12,014,669 B1
(45) Date of Patent: Jun. 18, 2024

(54) DETERMINING CANDIDATE FRAMES

(71) Applicant: Amazon Technologies, Inc., Seattle, WA (US)

(72) Inventor: Charles Benjamin Waggoner, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/853,718

(22) Filed: Jun. 29, 2022

(51) Int. Cl.
  *G06T 5/50* (2006.01)
  *G06T 5/92* (2024.01)
  *G06T 7/13* (2017.01)
  *G06V 20/40* (2022.01)
  *G09G 3/20* (2006.01)

(52) U.S. Cl.
  CPC ............. *G09G 3/2096* (2013.01); *G06T 5/50* (2013.01); *G06T 5/92* (2024.01); *G06T 7/13* (2017.01); *G06V 20/46* (2022.01); *G06T 2207/10016* (2013.01); *G09G 2320/0686* (2013.01)

(58) Field of Classification Search
  CPC .......... G09G 3/2096; G09G 2320/0686; G06T 7/13; G06T 5/009; G06T 5/50; G06T 2207/10016; G06V 20/46
  USPC ........................................................ 345/589
  See application file for complete search history.

(56) References Cited

U.S. PATENT DOCUMENTS

| 11,223,796 | B1* | 1/2022 | Gangwal | H04N 7/0125 |
| 2013/0002865 | A1* | 1/2013 | Pakulski | G06T 7/254 |
| | | | | 348/222.1 |
| 2015/0334398 | A1* | 11/2015 | Socek | H04N 19/182 |
| | | | | 375/240.26 |
| 2019/0163702 | A1* | 5/2019 | Garg | G06V 40/16 |
| 2019/0295504 | A1 | 9/2019 | Xiong et al. | |
| 2021/0225306 | A1 | 7/2021 | Sato et al. | |

FOREIGN PATENT DOCUMENTS

| CN | 106937114 | * | 7/2017 | ........... H04N 19/142 |
| CN | 112990191 | * | 6/2021 | ............... G06K 9/32 |
| WO | WO2020/135538 | * | 7/2020 | ............... G06K 9/00 |

* cited by examiner

Primary Examiner — Jin Ge
(74) Attorney, Agent, or Firm — Athorus, PLLC

(57) ABSTRACT

Disclosed are systems and methods that detect segments of video, such as HDR video, that include content, such as edges and details in dark scenes, that cannot be presented on some displays. Output models for different display types, such as edge-lit LCD, backlit LCD, etc., may be created and used to process video with respect to those different display types to determine if segments of the video cannot be presented on the display type at the pixel brightness values indicated in the video. In some implementations, HDR video may also or alternatively be compared to SDR video to determine segments of the video that are of interest, especially in low light scenes.

22 Claims, 9 Drawing Sheets

DETERMINING CANDIDATE FRAMES

BACKGROUND

High Dynamic Range ("HDR") video provides a larger palette for both dynamic range (via the perceptual quantizer electro-optical transfer function ("PQ EOTF")) and saturated colors (via ITU-R Recommendation BT.2020 (Rec. 2020 color space)). Standard Dynamic Range ("SDR") has such a limited maximum contrast ratio between black and white, that nearly all content uses the full range. Conversely, with HDR, creators of the content can choose very different subsets of that range, as is appropriate to the look of the video being created.

However, this large dynamic range of brightness has created challenges in content distribution. For example, while video that utilizes near-black shadow in dark scenes may look great in a production environment, the details of those scenes may be imperceptible on some models of televisions, especially when in a brighter viewing environment. For example, backlit liquid-crystal displays ("LCD"), edge-lit LCD, and some other models of televisions are incapable of displaying sufficient gradation between black and near-black, or accurately delivering hue or saturation near black. As a result, the intent of the creators of HDR content may be lost when the created video is viewed on these types of displays.

DETAILED DESCRIPTION

Disclosed are systems and methods that detect segments of video, such as HDR video, that include content, such as edges and details in dark scenes and/or bright scenes, that cannot be presented on some displays. The disclosed detection techniques may be utilized as part of a quality assurance ("QA") process before the video is released to ensure that the intent of the creator is conveyed when the content is presented on displays of different consumers of the content.

As discussed further below, output models for different display types, such as edge-lit LCD, backlit LCD, organic light emitting diode ("OLED") displays, etc., may be created and used to process video with respect to those different display types. As video content is generated, such as HDR video, the video may be processed with the output model of one or more display types to determine if details included in the video, such as edges, shadows, etc., can actually be reproduced and output by the display type. If segments of the video cannot be reproduced and output by the modeled display type, a notification may be generated that indicates the segment(s) of the video that cannot be reproduced and output by the modeled display type. These notifications may be utilized as part of a QA program so that the segments of the video can be altered so that the intent of the creators is conveyed and viewable on the modeled display type(s).

In some implementations, HDR video may be compared to SDR video to determine segments of the video that are of interest, especially in low light scenes and/or high brightness scenes, referred to herein as candidate segments or candidate frames. For example, if content, such as edges, shadows, etc., present in the HDR video is not present in the corresponding SDR video, the content may be considered extra or not necessary to convey the intent of the creators. In such implementations, frames of HDR video that include content that is not present in the corresponding SDR video may be skipped from processing. In comparison, frames of the HDR video that represent content that is also present in the SDR video may be processed using the disclosed implementations to verify that the content in the HDR video can be accurately represented on various display types.

Figure 1:
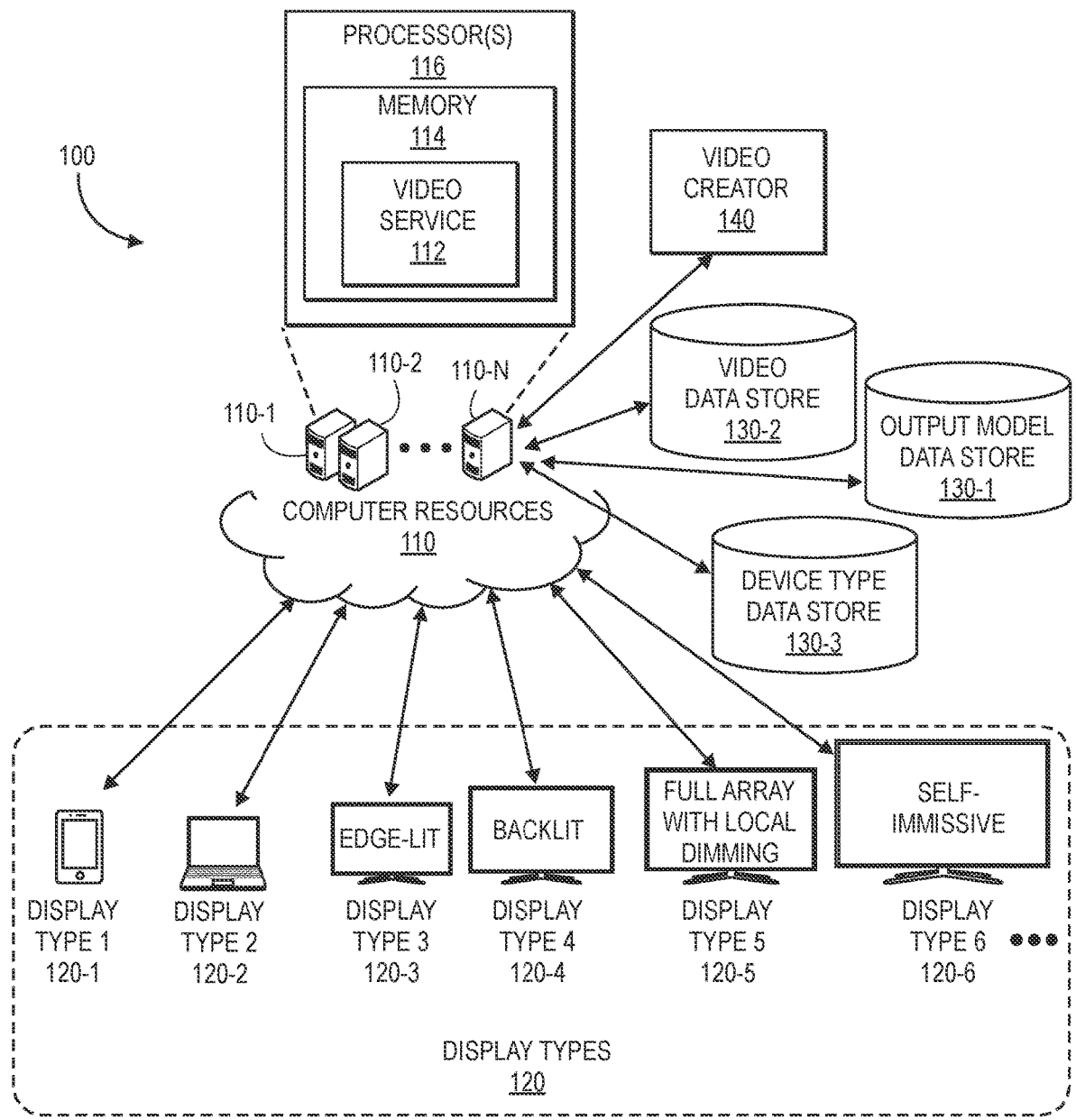
FIG. 1 is an illustration of an environment for detecting the visibility of dark scenes in video on different display types, in accordance with disclosed implementations.

FIG. 1 is an illustration of an environment 100 for detecting the visibility of dark scenes in video on different display types, in accordance with disclosed implementations.

As illustrated, a video service 112 may process videos, such as HDR videos maintained in a video file data store 130-2, videos received from a video creator 140, etc., to determine if there are segments of the video, such as edges, shadows, etc., in dark scenes and/or bright scenes that cannot be presented on one or more display types 120. Display types 120 include, but are not limited, display type 1 120-1 of a portable device (e.g., smart phone, tablet, etc.), display type 2 120-2 of a laptop or other computing device, display type 3 120-3 of an edge-lit LCD, display type 4 120-4 of a backlit LCD, display type 5 120-5 of a full array with local dimming LCD, display type 6 120-6 of self-emissive display, etc. In other examples, there may be fewer, additional, and/or different types of display types 120.

A video or video file, as used herein, may include any type of data that may be provided by the video service 112 to one or more devices that include any of the example display types 120 and/or other display types. For ease of discussion, the majority of the examples discussed herein relate to HDR video. However, the disclosed implementations are equally applicable to any type of video file and are not limited to HDR video.

As discussed in further detail below, the video service 112 may maintain a plurality of videos in one or more video file data stores 130-2. Likewise, one or more output models may be generated for each of the display types 120 and the output models maintained in an output model data store 130-1. Each output model may represent the display capabilities of the corresponding display type and, as discussed further below, utilized by the disclosed implementations to determine if there are segments of the media file that cannot be fully generated and presented by the display type 120. As will be appreciated, in some implementations, multiple different output files may be maintained for different display types. For example, there may be multiple different output files generated and maintained for edge-lit display types 120-3, each output file representing different capabilities of different edge-lit displays.

Likewise, a device type data store 130-3 that is accessible to the video service 112 may also be maintained that includes information about each device type 120, such as the display type, for which video files may be provided by the video service 112 for presentation by the device. The device type data store 130-3 may maintain any type of information for different device types in the device type data store 130-3 that may be useful by the video service 112.

The video service 112 may execute on one or more computing resource(s) 110. The computing resource(s) 110 may be remote from devices with different display types 120 and/or the different display types 120 may be local to the device when the output models are generated. In such examples, once the output models for the different display types 120 are generated, as discussed further below, the actual display types may no longer be needed.

As illustrated, the computing resource(s) 110 may be implemented as one or more servers 110(1), 110(2), ..., 110(N) and may, in some instances, form a portion of a network-accessible computing platform implemented as a computing infrastructure of processors, storage, software, data access, and so forth that is maintained and accessible by components/devices of the system via a network, such as an intranet (e.g., local area network), the Internet, etc.

The server system(s) 110 does not require end-user knowledge of the physical location and configuration of the system that delivers the services. Common expressions associated for these remote computing resource(s) 110 include "on-demand computing," "software as a service (SaaS)," "platform computing," "network-accessible platform," "cloud services," "data centers," and so forth. Each of the servers 110(1)-(N) include one or more processors 116 and memory 114, which may store or otherwise have access to the video service 112, as described herein.

The network through which the computing resources may communicate, and each of the other networks discussed herein, may utilize wired technologies (e.g., wires, USB, fiber optic cable, etc.), wireless technologies (e.g., radio frequency, infrared, NFC, cellular, satellite, Bluetooth, etc.), or other connection technologies. The network may be representative of any type of communication network, including data and/or voice network, and may be implemented using wired infrastructure (e.g., cable, CAT6, fiber optic cable, etc.), a wireless infrastructure (e.g., RF, cellular, microwave, satellite, Bluetooth, etc.), and/or other connection technologies.

Figure 2:
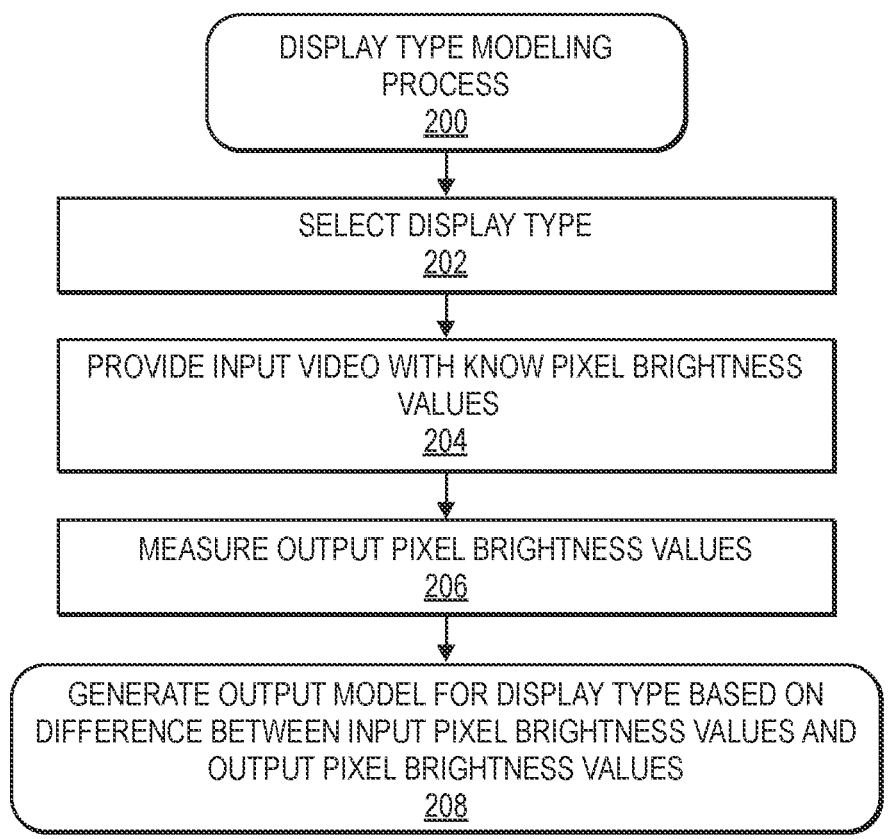
FIG. 2 is an example display type modeling process, in accordance with the disclosed implementations.

FIG. 2 is an example display type modeling process 200, in accordance with the disclosed implementations. The example process 200 may be performed for any number of display types 120 and/or for any number of different capabilities of each display type, to generate a respective output model for the display type that may then be maintained in the output model data store 130-1 and utilized by the video service 112 in accordance with the disclosed implementations. As discussed above, upon creation of an output model for a display type 120, the display type may no longer be needed, and the output model may be utilized by the disclosed implementations. Likewise, as discussed above, for display types that may include different capabilities of displays within the display type, different output models may be generated for each of the different capabilities of the different displays of the display type.

The example process 200 begins upon selection of a display type 120 for which an output model is to be generated, as in 202. The display type 120 may be any type of display with any level of capabilities upon which video maintained or provided by the video service 112 may be presented. For example, the display type 120 may correspond to a display type that may be found in the home of a customer of the video service 112, such as a display type for televisions. Example display types include, but are not limited to backlit LCDs 120-4, edge-lit LCDs 120-3, full array LCDs 120-5, OLED displays, etc.

Upon selection of a display type 120, an input video, such as an HDR video with known pixel brightness values, may be provided to the display type and output by the display type, as in 204. For example, the input video may be a test video that causes the output of different patterns or scenes that have brightness distributions for different pixels of the display. For example, some pixels of a frame of the output video may have a minimum brightness (e.g., black), others may have a median or mean brightness, while others may have a maximum brightness. The brightness of different pixels may change between some or all of the frames of the video file. Regardless of the input video file content, the brightness value of each pixel, as intended by the input video file, is known. For example, if the video file is an HDR video, the pixel brightness values may be maintained as a PQ value for each pixel of each frame.

As the input video is output and presented by the display type 120, the brightness value actually output by some or all of the pixels of the display type may be measured, as in 206. For example, a spectrophotometer, tristimulus colorimeter, etc., may be utilized to measure actual brightness of one or more pixels of the display type 120 as the input video is presented by the display type.

Based on the brightness value assigned to each pixel of each frame of the input video and the actual brightness value output by the display type 120 when presenting the input video file, an output model for the display type is generated, as in 208. For example, a histogram indicative of the differences between the intended or defined input pixel brightness values and the actual output pixel brightness values may be generated for the display type. In some implementations, the brightness value output for one pixel or plurality of pixels may impact the brightness value that may be output by other pixels of the display. For example, if a first plurality of pixels are output with a high brightness value range, which may result in a backlight utilized in some displays to be increased in brightness, it may result in the display type being incapable of presenting darker pixel values by other pixels of the display. In another example, in some implementations, the brightness value of some pixels in a frame may exceed the maximum or minimum brightness value that the display type is capable of presenting, independent of the brightness value of other pixels of the frame.

Figure 3:
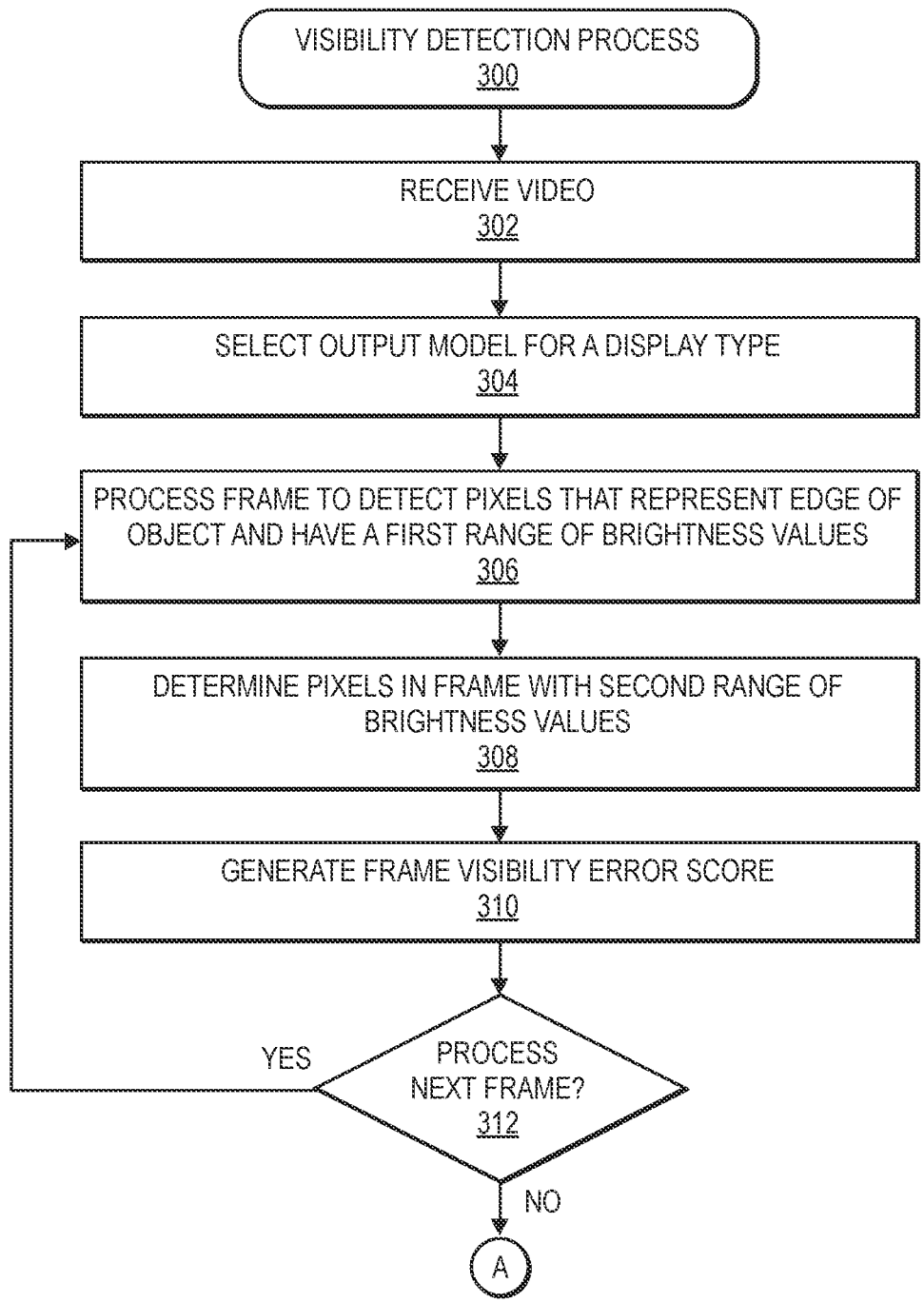
FIG. 3 is an example visibility detection process, in accordance with the disclosed implementations.
Figure 3:
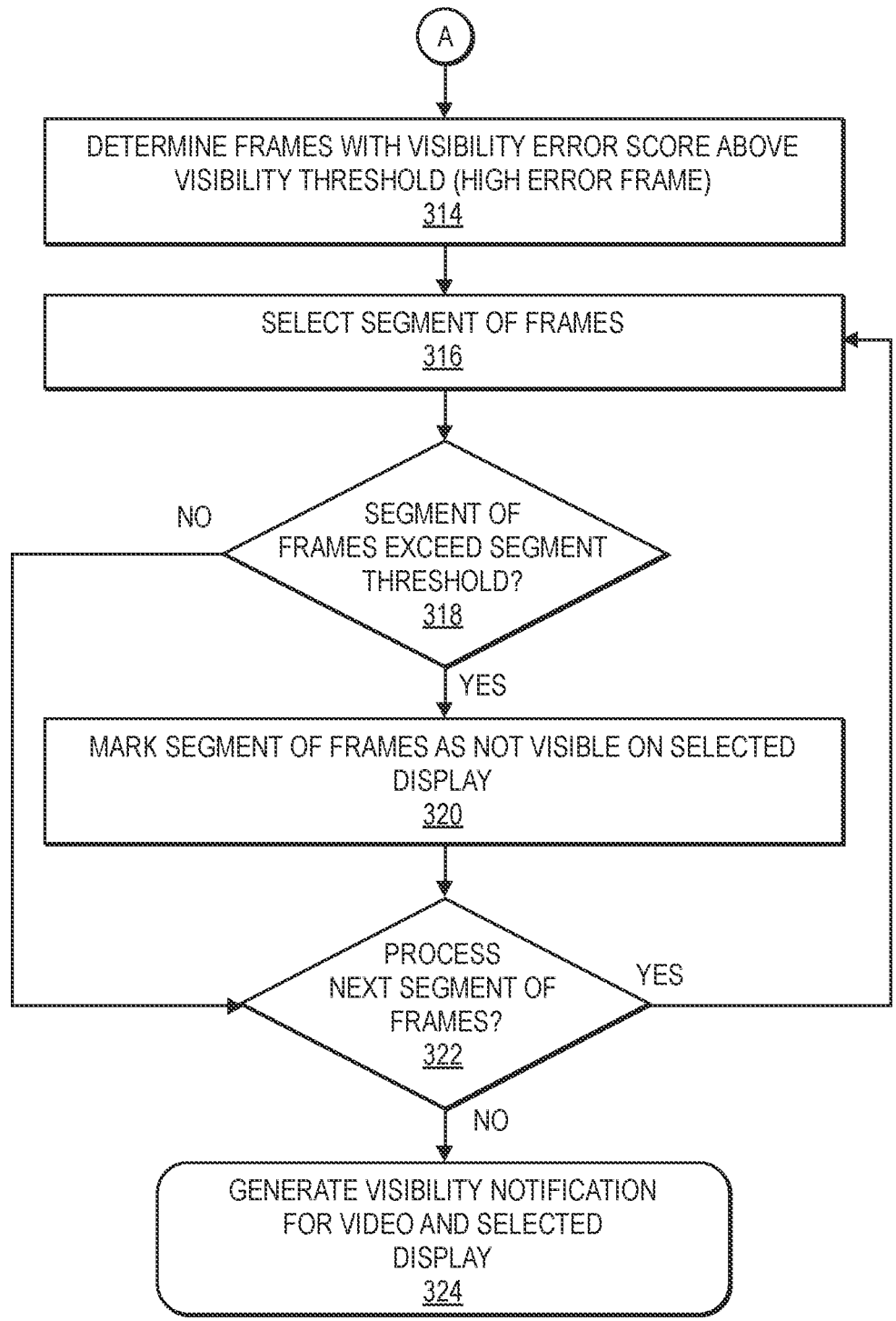

FIG. 3 is an example visibility detection process 300, in accordance with the disclosed implementations.

The example process 300 begins upon receipt or selection of a video file for which the example process 300 is to be performed, as in 302. The video file may be a video file received by the video service for which QA is to be performed before the video file is available to customers through the video service. In other examples, the video file may be a video file that is maintained by the video service 112. For example, if a new device type 120 is released and a new output model is generated for the device type (FIG. 2), the example process 300 may be utilized to process existing video files with respect to the new output model for the new device type. In still other examples, the example process 300 and/or other implementations disclosed herein, may be performed by a content creator 140 that is creating or has created the video as part of their own QA process before the video is provided to the video service 112. In still other examples, the example process 300 and/or the other implementations disclosed herein, may be performed by a third party that is independent from the content creator 140 and the video service 112.

For the video file, an output model that is to be used to process the video file is selected, as in 304. In some implementations, an output model(s) for the lowest capability display type(s) may be selected and utilized to process the video file. In some implementations, there may be multiple lowest capability display types, with different display types having different capabilities. By selecting the output model(s) for the lowest capability display(s), if it is determined that all segments of the video file can be properly output by the lowest capability display type(s) 120, the video file need not be processed for other, higher capability display types. In comparison, if it is determined that segments of the video cannot be fully presented on a lowest capability display, the example process 300 may be again performed utilizing an output model(s) for a next highest capability display type(s) 120. This process of moving up to the output model of the next highest capability display type 120 may continue until a display type or quality level of multiple display types that are able to fully present the video is determined. In still other examples, only the output model(s) for the lowest capability display type(s) 120 may be utilized. In yet another example, the output model(s) for the most frequently used display type(s) 120 may be utilized by the example process 300. For example, if the example process 300 is being performed by the video service 112, the video service may determine what display type or display types 120 are used by customers of the video service and output models for those display types may be utilized with the example process 300.

A frame of the video may then be processed to determine a first plurality of pixels that represent an edge of an object and have a first range of brightness values indicated in the video, as in 306. For example, the frame details indicated in the video file may be accessed to determine pixels having brightness values below a defined brightness value (e.g., below 20 PQ value)—a first range of brightness values. Those pixels may then be further processed to determine pixels that represent an edge of an object.

In addition to determining pixels of the frame that represent an edge of an object and also have brightness values within the first defined range of brightness values, pixels with a brightness value within a second defined range of brightness values may also be determined, as in 308. For example, the second defined range may be brightness values above 200 PQ value. In other examples, the first defined range of brightness values and the second defined range of brightness values may be different and those provided herein are by way of example only.

In some examples, the first range of brightness values and the second range of brightness values may be determined from the output model selected at block 304. For example, generation of the output model may determine a maximum brightness value that may be presented by pixels before the display type is no longer able to present a minimum brightness value at another pixel within the frame. These minimum and maximum values may indicate parameters of the first range of brightness values and the second range of brightness values.

Based on the brightness values indicated in the video for the first plurality of pixels that represent an edge of an object and brightness values indicated in the video for the second plurality of pixels, a frame visibility error score is generated, as in 310. The visibility error score may be any score or other indication of a number of pixels of the first plurality of pixels that are unable to be presented at the brightness value indicated in the video when presented on the display type 120 corresponding to the output model selected at block 304.

For example, if it is determined that all of the first plurality of pixels that represent an edge of an object are able to be presented by the display type at the brightness value indicated in the frame when the second plurality of pixels are presented at the brightness values indicated in the frame, the visibility error score may be zero. In comparison, if it is determined that none of the first plurality of pixels that represent an edge of an object can be presented by the display type at the brightness value indicated in the frame when the second plurality of pixels are presented at the brightness values indicated in the frame, the visibility error score may be one (or 100%), or any other value to indicate that the display type is not capable of presenting all pixels of the frame at the brightness values indicated in the frame.

In some implementations, in addition to, or as an alternative to determining if pixels may be presented at a defined brightness value based on other pixel brightness values defined for the frame, the example process 300 may also determine if there are pixels with assigned brightness values that cannot be displayed by the display type 120 corresponding to the output model, independent of the brightness values of other pixels. For example, if the video indicates that a plurality of pixels of the frame are to be presented with brightness values of 2,000 nits but the display type is only capable of presenting brightness values of up to 1,000 nits, a visibility error score may be updated or created to indicate pixels of the frame that are not capable of being displayed by the output type, independent of the brightness value of other pixels.

After generating a visibility error score for the frame, a determination may be made as to whether a next frame of the video is to be processed by the example process 300, as in 312. If it is determined that a next frame is to be processed, the example process 300 returns to block 306 and continues with the next frame. If it is determined that a next frame is not to be processed (e.g., all frames have been processed), frames with a visibility error score above a visibility threshold are determined, as in 314. The visibility threshold may be any value or other indication and may vary for different display types 120, different videos, etc. Overall, the visibility threshold may be used to filter out or remove frames that have low visibility error scores. In other implementations, the visibility error threshold may be omitted. Frames that have a visibility error score above the visibility threshold are referred to herein as "high error frames" or a "high error frame."

A segment of high error frames determined from the video may then be selected, as in 316. A segment of high error frames may be any defined number of high error frames that occur in a series of frames, any defined number of high error frames that occur during a period of time (e.g., 5 seconds), etc. Alternatively, a defined number of frames in a series of frames of the video may be selected at block 316, regardless of whether the frames have been indicated as high error frames.

A determination may then be made as to whether the number of high error frames included in the segment of frames exceeds a segment threshold, as in 318. A segment threshold may be any defined number or other indicator above which the segment is determined to include a number of frames in which a minimum number of pixels will not be able to be presented at the brightness values indicated in the video when other pixels of the frame are presented the brightness values indicated for those pixels in the video and/or pixels that are not capable of being presented at the defined brightness values independent of the brightness values specified for other pixels of the frame. For example, the segment threshold may be set to fifty and if fifty or more frames within the segment are indicated as high error frames, it may be determined that the segment exceeds the segment threshold.

If it is determined that the segment of frames exceeds the segment threshold, the segment of frames may be marked as not visible on the display corresponding to the output model utilized by the example process, as in 320. If it is determined at decision block 318 that the segment of frames does not exceed the segment threshold, or after marking the segment as not visible in block 320, a determination is made as to whether a next segment of frames of the video are to be processed, as in 322. In some implementations, all frames of the video may be processed in segments. For example, a segment of a defined size or number of frames may be specified, and all frames processed in a rolling window fashion so that all combinations of series of frames are considered for the video file.

If it is determined that a next segment of frames is to be processed, the example process 300 returns to block 316, selects a next segment of frames, and continues. If it is determined that the next segment of frames is not to be processed, a visibility notification may be generated for the video, as in 324. The visibility notification may provide or include an indication as to which, if any, segments of the video are not capable of being fully presented on the display type for which the output model was processed in FIG. 3. As noted above, the visibility notification may be utilized as part of a QA process to verify that the intent of the creators 140 of the video will be conveyed when the video is presented on different display types 120 or to identify segments of the video in which edges, shadows, or other objects represented in dark or low brightness aspects of a scene cannot be presented on a particular display type.

Figure 4:
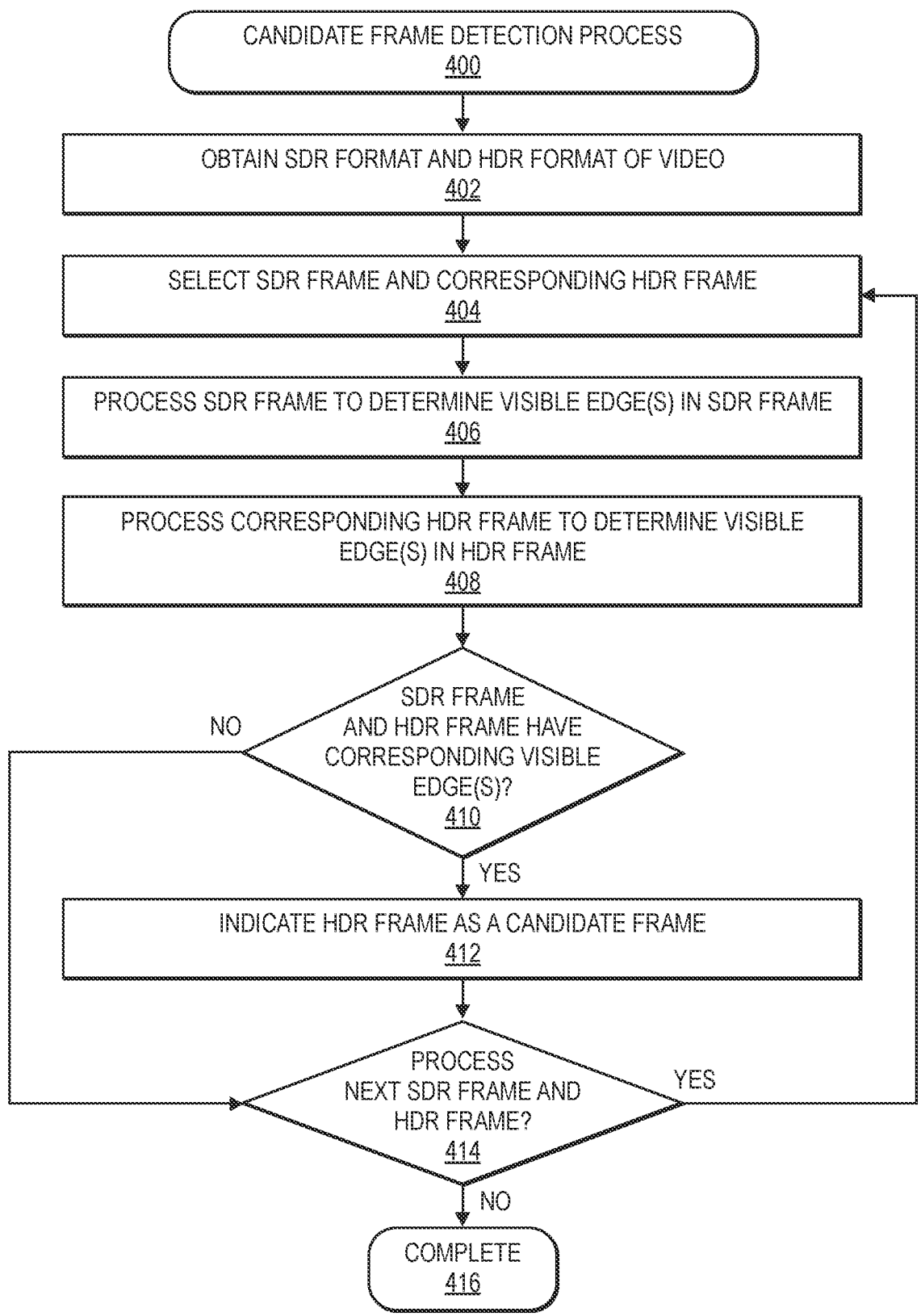
FIG. 4 is an example candidate frame detection process, in accordance with the disclosed implementations.

FIG. 4 is an example candidate frame detection process 400, in accordance with the disclosed implementations. In most instances, content creators 140 generate multiple formats of a video, such as an SDR format and an HDR format. Typically, the different formats have different brightness ranges, also referred to as dynamic ranges. For example, SDR has a limited dynamic range compared to HDR. Comparing the different formats of the same video may be useful in determining what details of a scene are intended by the content creator 140 as important. For example, if details in a low light scene are present in the HDR format of the video and present in the SDR format of the video, it can be determined that the details in that low light scene are intended by the content creator 140. In comparison, details in a low light scene present in the HDR content that are not present in the SDR content are likely not important or not specifically intended by the creator 140 of the content.

The example process 400 begins by obtaining a first format of the video, such as an SDR format, and a second format of the video, such as an HDR format, as in 402. For ease of discussion, and not by way of limitation, FIG. 4 is discussed with respect to the first format being an SDR format video and the second format being an HDR format video. In other implementations, the first format and/or the second format may be different. For example, one of the formats may be a 4K format video or a 5K format video.

A frame of the SDR video and a corresponding frame of the HDR video may then be selected, as in 404. The frame of the SDR format may then be processed to determine visible edges represented by pixels of the SDR frame, as in 406. Similar to edge detection above, any of a variety of edge detection techniques may be utilized to detect edges in a frame. In addition to processing the SDR frame, the corresponding HDR frame may be processed to detect edges in the corresponding HDR frame, as in 408.

A determination may then be made as to whether the SDR frame and the HDR frame have corresponding visible edges represented therein, as in 410. For example, pixel values of the edges may be compared between the SDR frame and the HDR frame to determine if edges in the SDR frame are also represented in the HDR frame and/or to determine if edges in the HDR frame are also represented in the SDR frame. More generally, the sections of the frames in which the edges are detected may be compared. For example, a first section of the SDR frame may be compared to a second section of the HDR frame to determine if the detected edges in those sections correspond.

If it is determined for the pair of frames, or section of those frames, that the detected edges are present in both the SDR frame and the HDR frame, the HDR frame may be indicated as a candidate frame in the HDR video, as in 412. In some implementations, the indication of the candidate frame may also include an indication of the section of the frame that is of potential interest—i.e., the section that includes the detected edge(s).

If it is determined that the detected edges are not present in both the SDR frame and the HDR frame, the HDR frame may not be indicated as a candidate frame. As noted above, edges detected in the HDR frame that are not present in the corresponding SDR frame are likely not intended or important to the creator because those edges are not present in the SDR frame.

After indicating the HDR frame as a candidate frame, or not marking the frame as a candidate frame, a determination is made as to whether the next SDR frame and corresponding HDR frame are to be processed, as in 414. In some examples, all frames of the HDR video may be compared with frames of the SDR video. In other examples, only frames corresponding to certain scenes, such as those known to have high or low light aspects, may be compared. In still other examples, a random or pseudo-random sampling of frames may be selected.

If it is determined that the next SDR frame and corresponding HDR frame are to be processed, the example process 400 returns to block 404 and continues. If it is determined that the next SDR frame and corresponding HDR frame are not to be processed, the example process 400 completes, as in 416.

Figure 5:
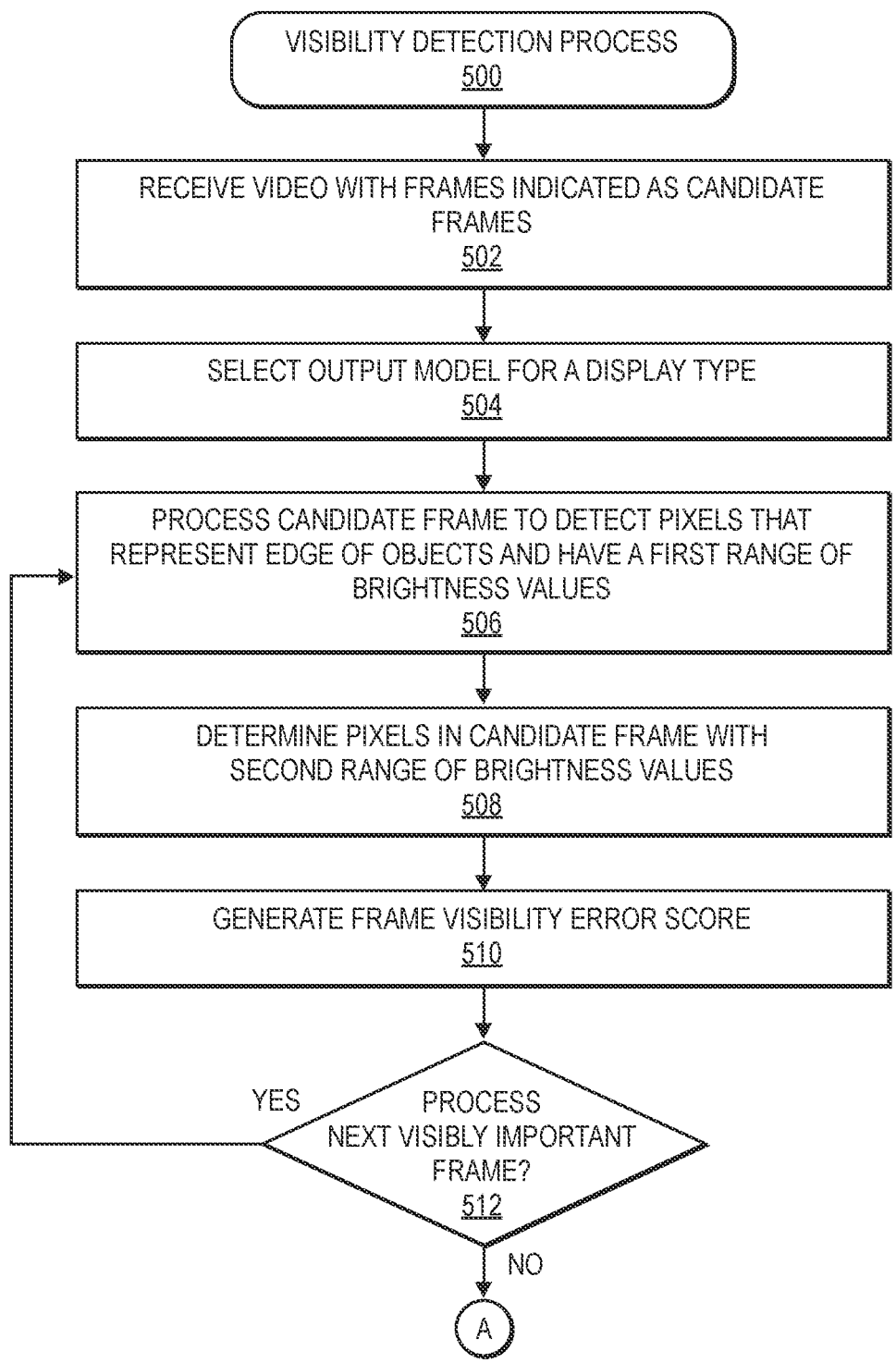
FIG. 5 is another example visibility detection process, in accordance with the disclosed implementations.
Figure 5:
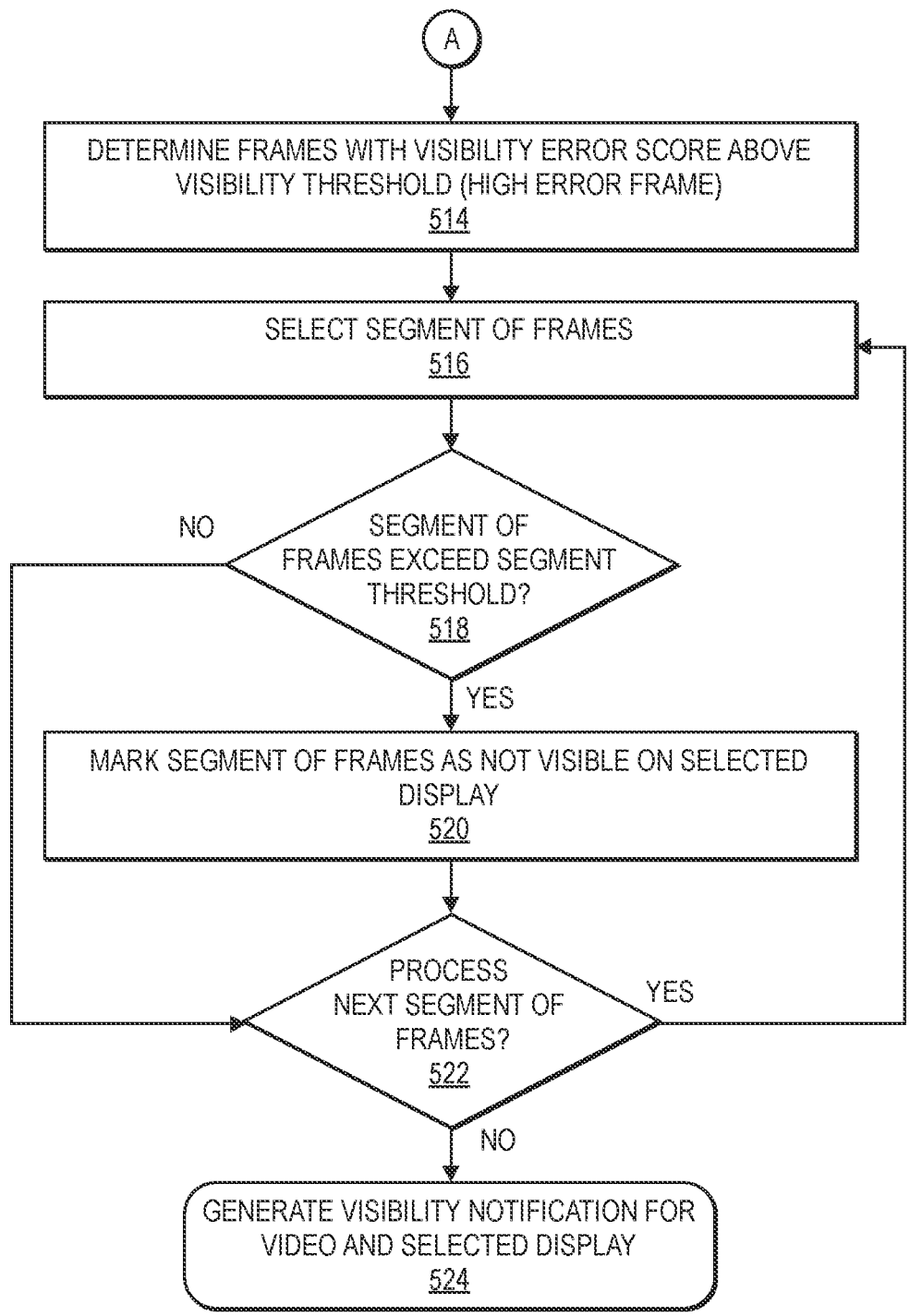

FIG. 5 is another example visibility detection process 500, in accordance with the disclosed implementations.

The example process 500 begins upon receipt or selection of a video file for which the example process 500 is to be performed, as in 502. In comparison to the example process 300 discussed above with respect to FIG. 3, the video file received or selected at block 502 includes frames indicated as candidate frames, which may be determined from the example process 400 (FIG. 4), discussed above.

The video file with frames indicated as candidate frames may be a video file received by the video service for which QA is to be performed before the video file is available to customers through the video service 112. In other examples, the video file may be a video file that is maintained by the video service 112. For example, if a new device type is released and a new output model is generated for the device type (FIG. 2), the example process 500 may be utilized to process existing video files with respect to the new output model for the new device type. In still other examples, the example process 500 and/or other implementations disclosed herein, may be performed by a content creator 140 that is creating or has created the video as part of their own QA process before the video is provided to the video service 112. In still other examples, the example process 500 and/or the other implementations disclosed herein may be performed by a third party that is independent from the content creator 140 and the video service 112.

For the video file, an output model that is to be used to process the video file is selected, as in 504. In some implementations, an output model(s) for the lowest capability display type may be selected and utilized to process the video file. In some implementations, there may be multiple lowest capability display types, with different display types having different capabilities. By selecting the output model(s) for the lowest capability display(s), if it is determined that all segments of the video file can be properly output by the lowest capability display type(s), the video file need not be processed for other, higher capability display types. In comparison, if it is determined that segments of the video cannot be fully presented on a lowest capability display, the example process 500 may be again performed utilizing an output model(s) for a next highest capability display type(s). This process of moving up to the output model(s) of the next highest capability display type(s) may continue until a display type or quality level of multiple display types that are able to fully present the video is determined. In still other examples, only the output model(s) for the lowest capability display type(s) may be utilized. In yet another example, the output model(s) for the most frequently used display type(s) may be utilized by the example process. For example, if the example process 500 is being performed by the video service 112, the video service may determine what display type or display types 120 are used by customers of the video service and output models for those display types may be utilized with the example process 500.

An indicated candidate frame of the video may then be processed to determine a first plurality of pixels that represent an edge of an object and have a first range of brightness values indicated in the video, as in 506. For example, the visually important frame may be accessed to determine pixels having brightness values below a defined brightness value (e.g., below 20 PQ value)—a first range of brightness values. Those pixels may then be further processed to determine pixels that represent an edge of an object.

In addition to determining pixels of the candidate frame that represent an edge of an object and also have brightness values within the first defined range of brightness values, pixels with a brightness value within a second defined range of brightness values may also be determined, as in 508. For example, the second defined range may be brightness values above 200 PQ value. In other examples, the first defined range of brightness values and the second defined range of brightness values may be different and those provided herein are by way of example only.

In some examples, the first range of brightness values and the second range of brightness values may be determined from the output model selected at block 504. For example, generation of the output model may determine a maximum brightness value that may be presented by pixels before the display type is no longer able to present a minimum brightness value at another pixel within the frame. These minimum and maximum values may indicate parameters of the first range of brightness values and the second range of brightness values.

Based on the brightness values indicated in the video for the first plurality of pixels that represent an edge of an object and brightness values indicated in the video for the second plurality of pixels, a frame visibility error score is generated, as in 510. The visibility error score may be any score or other indication of a number of pixels of the first plurality of pixels that are unable to be presented at the brightness value indicated in the video when presented on the display type 120 corresponding to the output model selected at block 504. For example, if it is determined that all of the first plurality of pixels that represent an edge of an object are able to be presented by the display type 120 at the brightness value indicated in the candidate frame when the second plurality of pixels are presented at the brightness values indicated in the candidate frame, the visibility error score may be zero. In comparison, if it is determined that none of the first plurality of pixels that represent an edge of an object can be presented by the display type 120 at the brightness value indicated in the candidate frame when the second plurality of pixels are presented at the brightness values indicated in the candidate frame, the visibility error score may be one (or 100%), or any other value to indicate that the display type is not capable of presenting all pixels of the candidate frame at the brightness values indicated in the candidate frame.

In some implementations, in addition to or as an alternative to determining if pixels of a candidate frame may be presented at a defined brightness value based on other pixel brightness values defined for the candidate frame, the example process may also determine if there are pixels of the candidate frame with assigned brightness values that cannot be displayed by the display type corresponding to the output model, independent of the brightness values of other pixels. For example, if the video indicates that a plurality of pixels of the candidate frame are to be presented with brightness values of 2,000 nits, but the display type is only capable of presenting brightness values of up to 1,000 nits, a visibility error score may be updated or created to indicates pixels of the candidate frame that are not capable of being displayed by the output type, independent of the brightness value of other pixels.

After generating a visibility error score for the candidate frame, a determination may be made as to whether a next candidate frame of the video is to be processed by the example process 500, as in 512. If it is determined that a next candidate frame is to be processed, the example process 500 returns to block 506 and continues with the next candidate frame. If it is determined that a next candidate frame is not to be processed (e.g., all candidate frames have been processed), candidate frames with a visibility error score above a visibility threshold are determined, as in 514. The visibility threshold may be any value or other indication and may vary for different display types 120, different videos, etc. Overall, the visibility threshold may be used to filter out or remove frames that have low visibility error scores. In other implementations, the visibility error threshold may be omitted. As discussed above, frames that have a visibility error score above the visibility threshold are referred to herein as "high error frames" or a "high error frame."

A segment of high error frames determined from the video may then be selected, as in 516. A segment of high error frames may be any defined number of high error frames that occur in a series of frames, any defined number of high error frames that occur during a period of time (e.g., 5 seconds), etc. Alternatively, a defined number of frames in a series of frames of the video may be selected at block 516, regardless of whether the frames have been indicated as high error frames.

A determination may then be made as to whether the number of high error frames included the segment of frames exceeds a segment threshold, as in 518. A segment threshold may be any defined number or other indicator above which the segment is determined to include a number of frames in which a minimum number of pixels will not be able to be presented at the brightness values indicated in the video when other pixels of the frame are presented at the brightness values indicated for those pixels in the video and/or pixels that are not capable of being presented at the defined brightness values independent of the brightness values specified for other pixels of the frame. For example, the segment threshold may be set to fifty and if fifty or more frames within the segment are indicated as high error frames, it may be determined that the segment exceeds the segment threshold.

If it is determined that the segment of frames exceeds the segment threshold, the segment of frames may be marked as not visible on the display corresponding to the output model utilized by the example process, as in 520. If it is determined at decision block 518 that the segment of frames does not exceed the segment threshold, or after marking the segment as not visible in block 520, a determination is made as to whether a next segment of frames of the video are to be processed, as in 522. In some implementations, all frames of the video may be processed in segments. For example, a segment of a defined size or number of frames may be specified, and all frames processed in a rolling window fashion so that all combinations of series of frames are considered for the video file.

If it is determined that a next segment of frames is to be processed, the example process 500 returns to block 516, selects a next segment of frames, and continues. If it is determined that the next segment of frames is not to be processed, a visibility notification may be generated for the video, as in 524. The visibility notification may provide or include an indication as to which, if any, segments of the video are not capable of being fully presented on the display type for which the output model was processed in FIG. 5. As noted above, the visibility notification may be utilized as part of a QA process to verify that the intent of the creators 140 of the video will be conveyed when the video is presented on different display types 120 or to identify segments of the video in which edges, shadows, or other objects represented in dark or low brightness aspects of a scene cannot be presented on a particular display type.

Figure 6:
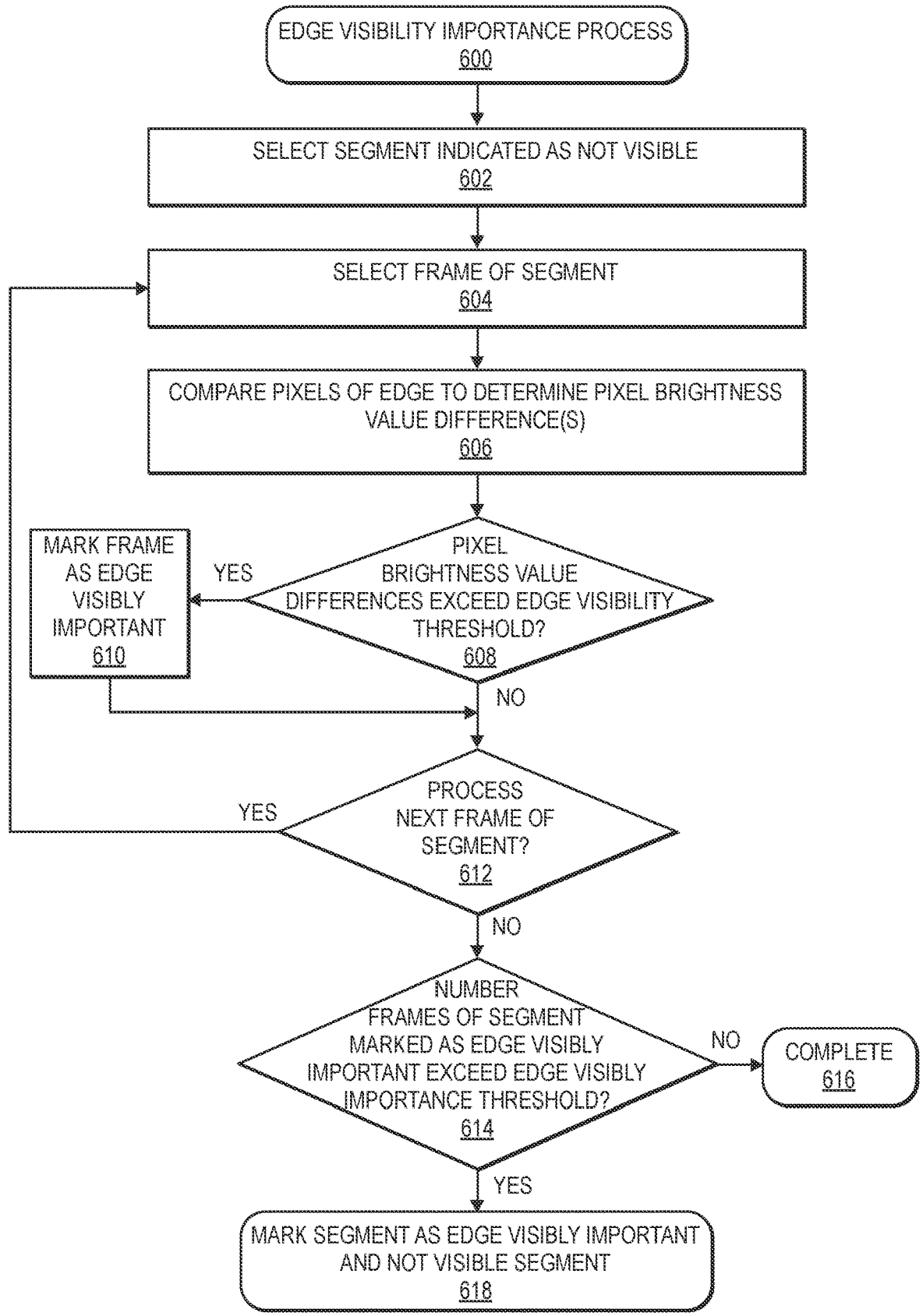
FIG. 6 is an example edge visibility importance process, in accordance with the disclosed implementations.

FIG. 6 is an example edge visibility importance process 600, in accordance with the disclosed implementations. The example process 600 may be performed for any frame or segment of frames that have been indicated as not visible or including pixel brightness values that cannot be presented on a display of a particular display type 120.

The example process 600 begins by selecting a segment of frames of a video that have been indicated as not able to be fully visually presented on a display of a display type 120, as in 602. From that segment, a frame is selected, as in 604, and pixel brightness values indicated in the frame of the video are compared with adjacent pixel brightness values indicated in the frame of the video to determine a difference in the adjacent pixel brightness values, as in 606. It may then be determined if the pixel brightness value differences exceed an edge visibility threshold, as in 608. The edge visibility threshold may be any threshold or other indicator as to whether an edge represented in a frame of a video is visually important. For example, if the brightness difference value of adjacent pixels that define a detected edge in a frame of a video are below the edge visibility threshold, it may be determined that the detected edge, even if the pixels are presented at the indicated pixel brightness values, will not be visually perceived and therefore the edge is not visually important. In comparison, if the brightness difference value of adjacent pixels that define a detected edge in a frame of a video are above the edge visibility threshold, it may be determined that the detected edge is visually important.

If it is determined at decision block 608 that the pixel brightness value differences for the detected edge in the frame exceed the visibility threshold, the frame may be indicated as an edge visibly important frame, as in 610. If it is determined at decision block 608 that the pixel brightness value differences for the detected edge in the frame do not exceed the visibility threshold, the frame may not be indicated as an edge visibly important frame. After marking the frame as an edge visually important frame at block 610, or if it is determined that the frame is not edge visually important at decision block 608, a determination is made as to whether to process a next frame of the segment, as in 612.

If it is determined that the next frame of the segment is to be processed, the example process 600 returns to block 604, selects the next segment of the frame, and continues. If it is determined at decision block 612 that the next frame of the segment is not to be processed, a determination is made as to whether a number of frames of the segment that have been marked as edge visibly important exceeds an edge visibly important threshold, as in 614. As with the other thresholds discussed herein, the edge visibly important threshold may be any value or other indicator to determine whether the segment includes a minimum number of frames that have been determined to include edges that are visually important.

If it is determined at decision block 614 that the number of frames of the segment marked as edge visibly important exceeds the edge visibility threshold, the segment of frames may be marked as both edge visibly important and as a not visible segment for the display type, as in 618. In comparison, if it is determined that the number of frames of the segment marked as edge visibly important does not exceed the edge visibility threshold, the segment may not be marked as edge visibly important and the process 600 may complete, as in 616. In such an example, a notification may still be generated, as discussed herein, that the segment of the video cannot be fully presented on the display type 120 that was used to process the video in accordance with the disclosed implementations. In other examples, the notification may not be generated for the segment because, even though the segment is determined to be not visible on the processed display type 120, it is further determined that the edge that will not be visible on the display type is not visibly important, as determined by the example process 600.

Figure 7:
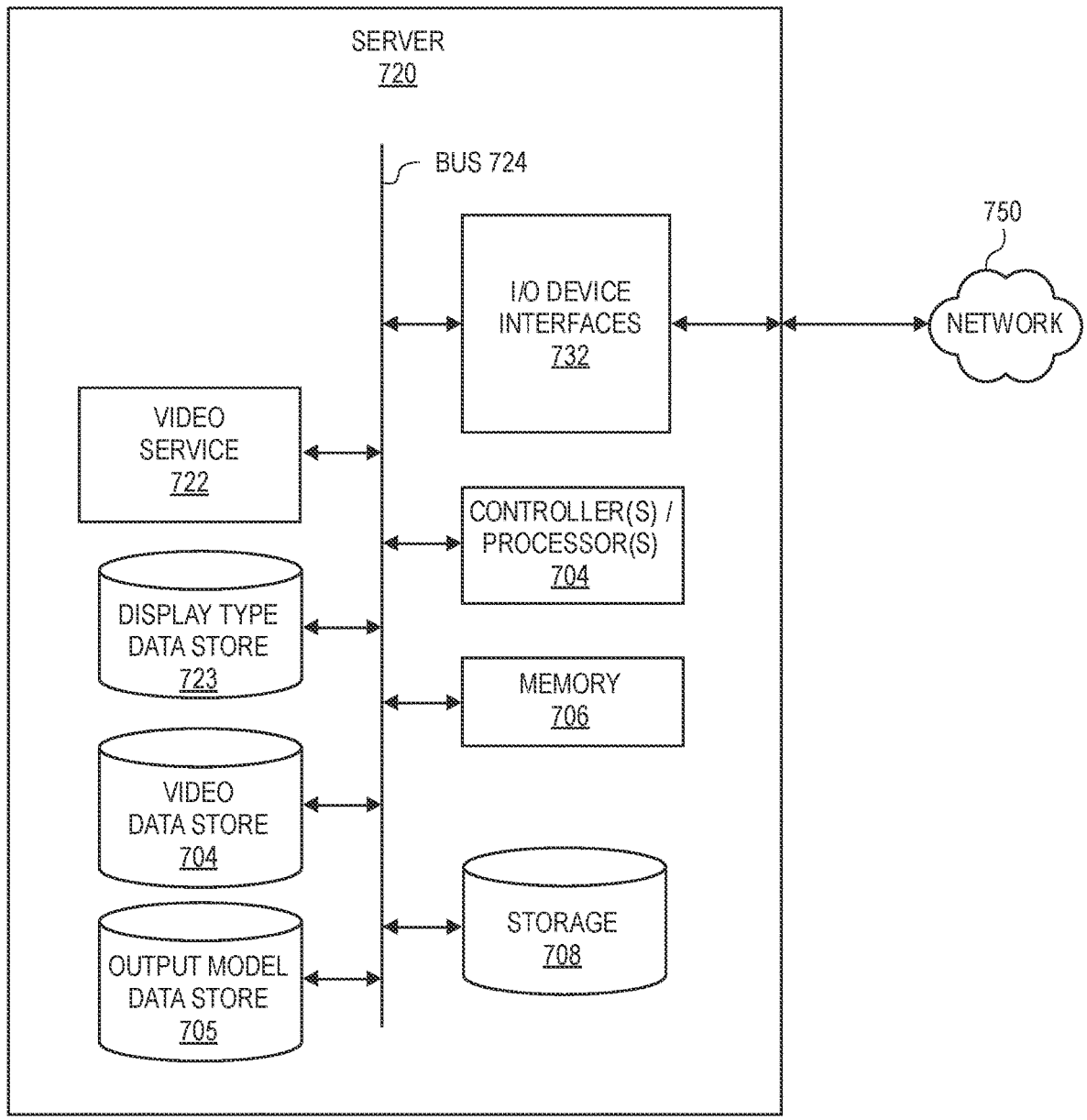
FIG. 7 illustrates example components of a server, in accordance with described implementations.

FIG. 7 is a block diagram conceptually illustrating example components of a remote computing device, such as a remote server 720 that may include the video service 722. Multiple such servers 720 may be included in the system. In operation, each of the servers 720 may include computer-readable and computer-executable instructions that reside on the respective server 720, as will be discussed further below.

The server 720 may include one or more controllers/processors 704, that may each include a central processing unit (CPU) for processing data and computer-readable instructions, and a memory 706 for storing data and instructions of the server 720. The memories 706 may individually include volatile random-access memory (RAM), non-volatile read only memory (ROM), non-volatile magnetoresistive random-access memory (MRAM) and/or other types of memory. Each server may also include a data storage component 708, for storing data, controller/processor-executable instructions, etc. Likewise, the server 720 may include or be operable to access a display type data store

723, a video data store 704, and/or an output model data store 705. Each data storage component and/or data store may individually include one or more non-volatile storage types such as magnetic storage, optical storage, solid-state storage, etc. The server 720 may also be connected to removable or external non-volatile memory and/or storage (such as a removable memory card, memory key drive, networked storage, etc.) through an input/output device interface 732.

Computer instructions for operating each server 720 and its various components may be executed by the respective device's controller(s)/processor(s) 704, using the memory 706 as temporary "working" storage at runtime. A server's computer instructions may be stored in a non-transitory manner in non-volatile memory 706, storage 708, or an external device(s). Alternatively, some or all of the executable instructions may be embedded in hardware or firmware on the respective device in addition to, or instead of software.

The server 720 may also include input/output device interfaces 732. A variety of components may be connected through the input/output device interfaces. Additionally, the server 720 may include an address/data bus 724 for conveying data among components of the server. Each component within a server 720 may also be directly connected to other components in addition to (or instead of) being connected to other components across the bus 724.

Any form of wired and/or wireless communication may be utilized to facilitate communication between the server 720 and other devices. For example, any one or more of 802.15.4 (ZIGBEE), 802.11 (WI-FI), 802.16 (WiMAX), BLUETOOTH, Z-WAVE, near field communication ("NFC"), cellular, CAT6, etc., may be used to enable communication to and from the server. For example, the input/output device interfaces 732 may connect to one or more networks 750 via a wireless local area network (WLAN), (such as Wi-Fi) radio, Bluetooth, and/or wireless network radio, such as a radio capable of communication with a wireless communication network, such as a Long-Term Evolution (LTE) network, WiMAX network, 5G network, etc. A wired connection such as Ethernet may also be supported.

The server 720 may include a video service 722 that performs different aspects of the disclosed implementations.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and video files should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some, or all of the specific details and steps disclosed herein.

Moreover, with respect to the one or more methods or processes of the present disclosure shown or described herein, including but not limited to the flow charts shown in FIGS. 2 through 6, orders in which such methods or processes are presented are not intended to be construed as any limitation on the claims, and any number of the method or process steps or boxes described herein can be combined in any order and/or in parallel to implement the methods or processes described herein. In addition, some process steps or boxes may be optional. Also, the drawings herein are not drawn to scale.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
processing a first frame of a first video produced in a standard dynamic range ("SDR") format to determine a first edge of a first object represented by a first plurality of pixels in the first frame;
processing a second frame of a second video produced in a high dynamic range ("HDR") format to determine a second edge of a second object represented by a second plurality of pixels in the second frame;
comparing the first plurality of pixels and the second plurality of pixels to determine that the first edge of the first object represented in the first frame corresponds to the second edge of the second object represented in the second frame; and
in response to determining that the first edge corresponds to the second edge, indicating that the second frame is a candidate frame in the HDR video.

2. The computer-implemented method of claim 1, further comprising:
processing a third frame of the second video to determine a third edge of a third object represented by a third plurality of pixels in the third frame;
comparing the third plurality of pixels with a fourth plurality of pixels of a fourth frame of the first video to determine that the third edge of the third object does not correspond to any object in the fourth frame; and
in response to determining that the third edge does not correspond to any object represented in the fourth frame, not marking the third frame as a candidate frame.

3. The computer-implemented method of claim 2, further comprising:
processing the second frame without processing the third frame to determine a segment of the second video that cannot be presented on a display type with pixel brightness values indicated in the second video.

4. The computer-implemented method of claim 3, wherein processing the second frame includes:
comparing at least a portion of pixel brightness values of a plurality of pixels of the second frame with an output model defined for the display type to determine that, when a first pixel of the plurality of pixels is presented at a first pixel brightness indicated in the second video, a second pixel of the plurality of pixels cannot be presented on the display type at a second pixel brightness value indicated in the second video.

5. The computer-implemented method of claim 4, wherein the display type is at least one of a backlit display type or an edge-lit display type.

6. The computer-implemented method of claim 4, wherein:
the second pixel corresponds to a low brightness value portion of a scene represented in the second frame; and
the first pixel corresponds to a high brightness value portion of the scene represented in the second frame.

7. A computing system comprising:
one or more processors; and
a memory storing program instructions that, when executed by the one or more processors, cause the one or more processors to at least:
process a first frame of a first video produced in a first format to determine a first edge of a first object represented by a first plurality of pixels in the first frame;
process a second frame of a second video produced in a second format to determine a second edge of a second object represented by a second plurality of pixels in the second frame, wherein the second format of the second video is different than the first format of the first video;
compare the first plurality of pixels and the second plurality of pixels to determine that the first edge of the first object represented in the first frame corresponds to the second edge of the second object represented in the second frame; and
in response to determination that the first edge corresponds to the second edge, indicate that the second frame is a candidate frame in the second video.

8. The computing system of claim 7, wherein the program instructions that, when executed by the one or more processors, further cause the one or more processors to at least:
determine, based at least in part on an output model defined for a first display type, that at least a portion of the second plurality of pixels cannot be presented on the first display type at a first range of brightness values when a third plurality of pixels of the second frame are presented at a second range of brightness values.

9. The computing system of claim 8, wherein the second range of brightness values have higher brightness values than the first range of brightness values.

10. The computing system of claim 7, wherein the program instructions that, when executed by the one or more processors, further cause the one or more processors to at least:
process a third frame of the second video to determine a third edge of a third object represented by a third plurality of pixels in the third frame;
compare the third plurality of pixels with a fourth plurality of pixels of a fourth frame of the first video to determine that the third edge of the third object does not correspond to any object in the fourth frame; and
in response to determination that the third edge does not correspond to any object represented in the fourth frame, not marking the fourth frame as a candidate frame.

11. The computing system of claim 10, wherein the program instructions that, when executed by the one or more processors, further cause the one or more processors to at least:
process the second frame without processing the third frame to determine a segment of the second video that cannot be presented on a display type with pixel brightness values indicated in the second video.

12. The computing system of claim 11, wherein the program instructions that, when executed by the one or more processors, further cause the one or more processors to at least:
compare at least a portion of pixel brightness values of a plurality of pixels of the second frame, with an output model defined for the display type to determine that when a first pixel of the plurality of pixels is presented at a first pixel brightness indicated in the second video, a second pixel of the plurality of pixels cannot be presented on the display type at a second pixel brightness value indicated in the second video.

13. The computing system of claim 7, wherein the first plurality of pixels are representative of an object in a low brightness scene or a high brightness scene.

14. The computing system of claim 7, wherein:
the first format is a standard dynamic range format; and
the second format is a high dynamic range format.

15. The computing system of claim 13, wherein the program instructions that, when executed by the one or more processors, further cause the one or more processors to at least:
determine that the first edge is represented by low brightness pixels that are also represented in the second video.

16. A method, comprising:
processing a first frame of a first video produced in a first format to determine a first object represented in at least a first portion of the first frame;
processing a second frame of a second video produced in a second format to determine a second object represented in at least a second portion of the second frame, wherein the second format of the second video is different than the first format of the first video;
comparing the first portion of the first frame and the portion of the second frame to determine that the first object represented in the first frame corresponds to the second object represented in the second frame; and
in response to determining that the first object corresponds to the second object, indicating that the second frame is a candidate frame in the second video.

17. The method of claim 16, further comprising:
processing a third frame of the second video to determine a third object represented in at least a third portion of the third frame;
comparing the third portion with a fourth portion of a fourth frame of the first video to determine that the third object does not correspond to any object in the fourth frame; and
in response to determining that the third object represented by the third portion of the second video does not correspond to any object represented in the fourth frame of the first video, not marking the third frame of the second video as a candidate frame.

18. The method of claim 17, further comprising:
processing the second frame, without processing the third frame, to determine whether one or more pixels of the second frame cannot be presented at a pixel brightness value indicated in the second video.

19. The method of claim 17, further comprising:
processing a segment that includes a plurality of frames of the second video, wherein the plurality of frames includes the second frame and the third frame, to determine whether the segment of frames is a candidate frame.

20. The method of claim 17, wherein processing the second frame includes:
processing the second frame with an output model to determine whether one or more pixels of the second frame cannot be presented on a display type represented by the output model at a pixel brightness value indicated in the second video.

21. The computing system of claim 7, wherein the first format is a standard dynamic range format.

22. The computing system of claim 7, wherein the second format is at least one of a high dynamic range format, a 4K format, or a 5K format.

* * * * *